Dec. 5, 1950 E. R. DE WEESE 2,532,293

TONE ARM CARRIAGE

Filed July 12, 1946 2 Sheets-Sheet 1

EUGENE R. DEWEESE
INVENTOR

By William D. Hall
ATTORNEY

EUGENE R. DE WEESE
INVENTOR

By- William D. Hall.
ATTORNEY

Patented Dec. 5, 1950 2,532,293

UNITED STATES PATENT OFFICE 2,532,293

TONE ARM CARRIAGE

Eugene R. De Weese, Arlington, Va.

Application July 12, 1946, Serial No. 683,197

4 Claims. (Cl. 274—23)

(Granted under the act of March 3, 1883, as amended April 30, 1928; 370 O. G. 757)

The invention described herein may be manufactured and used by or for the Government for governmental purposes, without the payment to me of any royalty thereon.

This invention is in phonographic recording and playback equipment and particularly is a novel tone arm for transcribing disc records.

For home use, commercial phonographs provide transcriptions that are for the most part satisfactory, even though they are not true reproductions of the recorded material, but for laboratory work and in other situations where high-fidelity reproduction is necessary or desirable commercial pickup arms will not suffice.

One of the principal difficulties arises from the fact that disc records are cut by a device which moves in a straight line from the outer periphery to the inner portion of the record, usually in a radial line, whereas conventional playback pickups are mounted on arms which are pivoted and thus required to travel an arcuate path from the rim of the record to the center.

The principal object of this invention is to provide means for tracking a pickup needle over a disc record in a straight path rather than a curved path.

Another object is to provide in a pickup arm of the nature mentioned means for duplicating the path of the stylus which cut the record.

Additional objects are to provide a tone arm for the playback of recorded material which is exceptionally capable of compensating for irregularities in a record disc, and to eliminate a large part of the wear normally incident to playback operations.

Other objects will be apparent from a reading of the following specification and claims.

Figure 3:
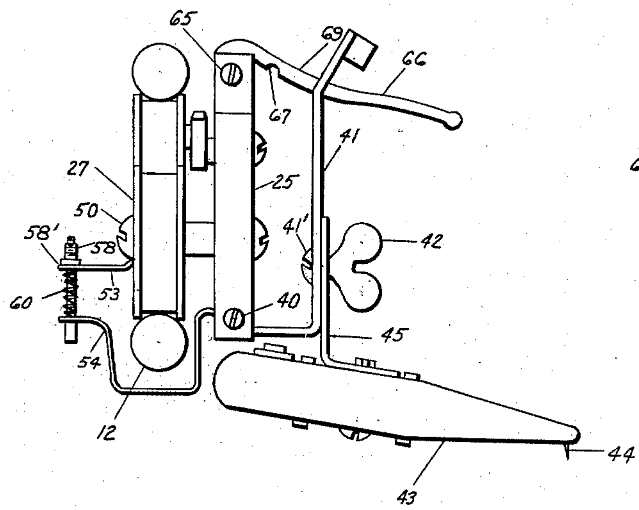
Figure 3 is a side view of my novel carriage which supports the needle cartridge, the parts being shown in playing condition.
Figure 3A:
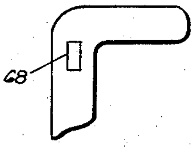
Figures 4, 5:
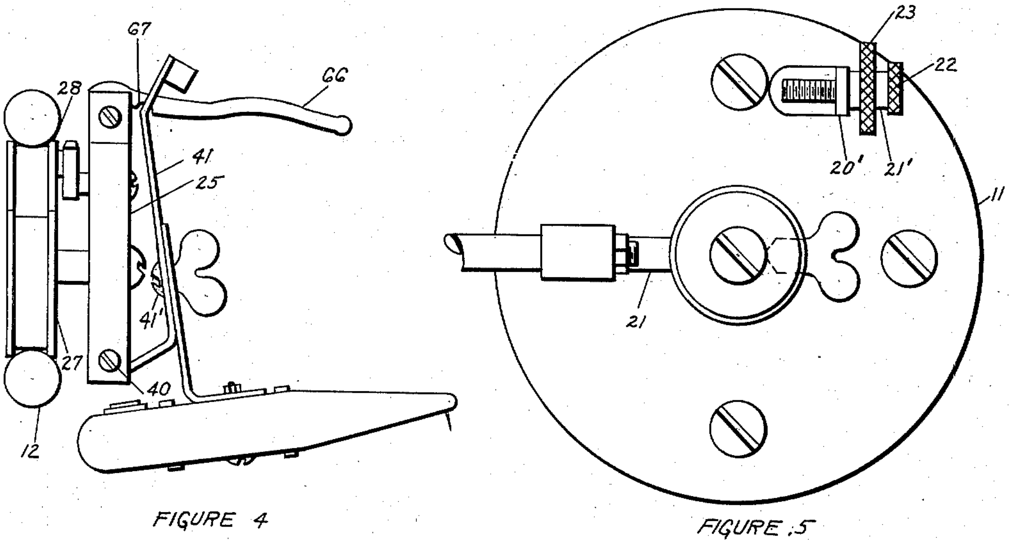

Figure 3*a* is a detail of the means for supporting and handling the needle and cartridge;

Figure 4 is a view similar to that of Figure 3 but showing the parts in nonplaying relation; and Figure 5 is a plan view of the supporting structure for my novel tone arm.

Figures 1, 2:
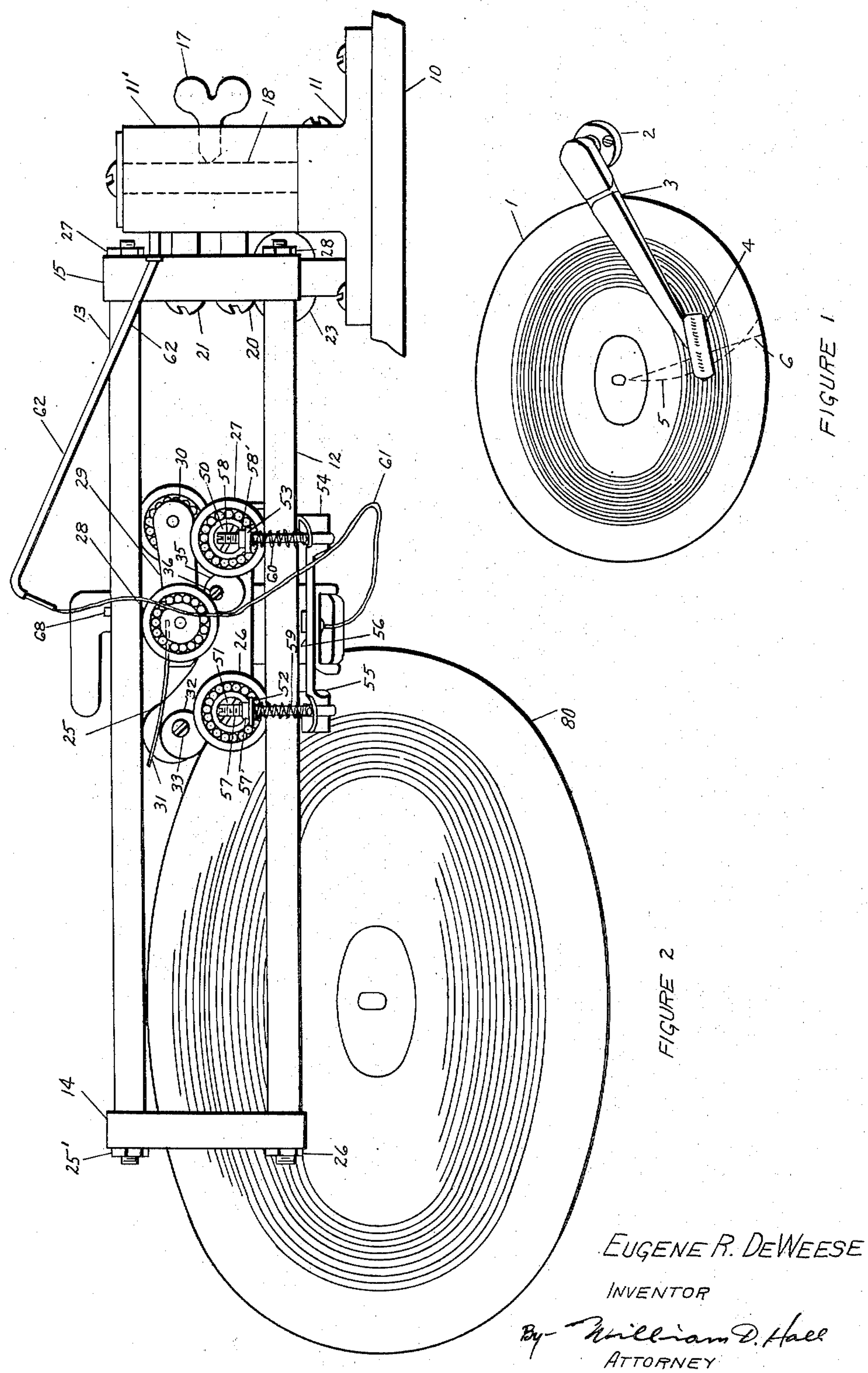
Figure 1 illustrates a conventional phonograph tone arm and offers a comparison between its path during the playback of a record and the path followed by the stylus which cut the record.
Figure 2 is a view of the tone arm of my invention showing the general relationship of the various parts.

In Figure 1 of the drawings may be seen a record disc 1 mounted on turntable, not shown.

Adjacent the record and fastened suitably to any convenient part of the apparatus is a base member 2 whereon is supported for free swinging movement a pickup arm 3, conventional in form. It will be seen that the head 4 of arm 3 must travel from the beginning of the record groove to the end in a curved path indicated at 5, the path being an arc determined by the length of the arm and the location of its pivot. This path cannot coincide with that followed by the stylus which cut the record at more than two points (the cutting path being indicated at 6), and usually will intersect but once. It follows, of course, that at all times in the playback except at the instant or instants of correspondence of the two paths the transcription is somewhat out of phase with the recorded material. For most purposes, as has already been suggested, the discrepancy is not of importance, but in some cases absolute accuracy is essential and is not available by any means known except as will be hereinafter described.

According to Figure 2, 10 is a base to which the novel tone arm of this invention is affixed and which may be any convenient part of a playback apparatus. The tone arm assembly proper includes a pedestal 11 and 11′ and two parallel bars 12 and 13 vertically spaced and aligned, the spacing being determined by two cross members 14 and 15. The members 12 and 13 are mounted through crosspiece 15 on pedestal member 11′ in any convenient fashion but preferably removably, as by screws 20 and 21. Bars 12 and 13 are in the embodiment shown made of a light, hard alloy which can be finished to a high degree of smoothness and accuracy. It is feasible to make the parallel bars 12 and 13 and cross members 14 and 15 as an integral structure, but by making the latter separate from the former and assembling the parts with nuts 25′, 26, 27, and 28, for example, certain advantages are achieved in the way of adjustability, replacement, and so forth.

It will be noted that top portion 11′ of the pedestal structure which supports the tone arm assembly is separate from the lower part 11 except for a spindle 18 which runs vertically through the two members. It is, therefore, possible not only to locate the rails 12 and 13 along a number of different lines with respect to the grooves in the record disc, but more important to swing the rail structure entirely out of the way. This is, of course, accomplished by loosening the wingnut 17 which bears against spindle 18. After a desired location of the playback arm has been established, wingnut 17 is tightened.

Pedestal 11 bears, in addition to the parts already enumerated, a structure 20′ (see Figure 5) which is merely a post with a threaded opening therethrough adapted to hold a screw 21′. The screw is so arranged as to abut against rail 12 or crosspiece 15. Preferably, the screw has a knurled head 22; and, preferably also, a locknut 23 is provided to secure the screw in a desired position. The usefulness of the structure 20—23 will be hereinafter more fully described, but for the moment it is sufficient to say that it permits the return of structure 12—15 to its exact former position after movement of the parts out of playing relation to a record disc.

Referring again to Figure 2, there may be seen a carriage the purpose of which is to support the playing needle. The carriage includes a frame 25, two grooved wheels 26 and 27, running upon rail 12, and a third wheel 28 running against upper rail 13. Preferably, all wheels are mounted in ball bearings to permit the freest possible movement.

Wheel 28 is carried by an arm 29 which is pivoted at one end in a further ball bearing 30. The other end of arm 29 is provided with an extension 31 in the nature of a thin strip of spring-tempered wire; the last mentioned spring member rests upon an eccentric 32 pivoted at 33. This construction permits wheel 28 to bear against rail 13 at all times, giving slightly upward or downward in response to minor irregularities in rail 13. The tensions of the parts can be varied by adjusting eccentric 32 upon its pivot, it being apparent that, for example, a half turn clockwise (from the position shown in Figure 2) would increase such tension while a partial turn counterclockwise from that position would decrease the tension.

A further eccentric 35 with a pivot 36 provides means for limiting the downward movement of arm 29 (aligned therewith).

With reference particularly to Figures 3 and 4 (wherein for clarity certain elements have been omitted), it can be seen that frame 25 of the carriage has pivoted thereon at 40 a bracket 41 provided with a screw 41′ (riveted or otherwise secured thereto) and a wingnut 42 cooperating therewith to hold a needle cartridge 43 and a needle 44. Support 45 for the cartridge and needle is preferably provided with a slot (not shown in the drawings) which makes possible a certain amount of vertical adjustment of the needle; such mounting means also permit rapid interchange of pickup heads, standard brackets being used on all.

On the opposite side of the structure just described and secured under the heads of screws 50 and 51 which support wheels 26 and 27 are two brackets 52 and 53 of spring-tempered metal. Two cooperating spring members 54 and 55 which may be connected at one point as 56 (Figure 2) are secured to bracket 41 and pivot therewith at 40. The other ends of members 54 and 55 are provided with openings aligned with similar openings in brackets 52 and 53, and pins 57 and 58 are passed therethrough and secured by nuts 57′ and 58′, respectively. Springs 59 and 60 are placed around the pins and between the elements secured thereby. The primary function of this structure is to provide control of needle pressure which will normally vary from one playback head to another.

Lead 61, extending between the needle cartridge and amplifying apparatus, is a light flexible wire adjustably supported by arm 62 from pedestal member 11′ above the rails 12 and 13 and preferably about midway the travel of the carriage. The drag produced is negligible.

At the top of frame 25 and pivoted therein at 65 is an arm 66, having a notch 67 near the upper end thereof. Arm 66 passes through a slot 68 (Figure 3*a*) in member 41. The structure serves mainly to hold needle 44 in a raised position out of engagement with any record disc that may be upon the turntable. As will be seen in Figure 4, notch 67 engages member 41 at the lower extremity of slot 68. While the needle and cartridge may be lifted to their raised position by direct manipulation, the arrangement shown provides means for lifting them merely by raising arm 66 which causes slot 68 to ride up the curved surface 69 of arm 66. At the upper limit of travel of member 41, arm 66 is dropped quickly, and notch 67 engages member 41. To lower the needle, arm 66 is raised momentarily and then lowered slightly, and the upper end of slot 68 rides down the curved surface of arm 66 so that needle 43 can be placed gently in its desired location.

The operation of the apparatus will be apparent and but briefly described. Where the utmost in accuracy is necessary, the line followed by the cutting stylus on the record in question will be ascertained by tests or otherwise and rails 12 and 13 (wingnut 17 being loosened) will be swung until they coincide exactly with such line, whereupon wingnut 17 is tightened. Knurled head screw 21′—22 is then turned in until the head of the screw just touches crosspiece 15 of the rail assembly, and locknut 23 secured.

With record 80 rotating, the operator grasps arm 66 and, holding it raised, moves the carriage along rails 12 and 13 until the initial groove is reached. Arm 66 is then lowered and thereby lowers the needle onto the record. The carriage moves along the rails under the influence of the needle in the sound track until the end of the record is reached. Should it be necessary for any reason to lift the needle before the playback is completed, this is accomplished as explained by lifting arm 66 and permitting notch 67 to engage member 41. The wingnut 17 can then be loosened and the whole structure swung away from the record, if necessary, with assurance that, when the arm is moved back to abutting relation with screw 21′, the proper angular relationship of arm to record has been established.

In addition to the fact above emphasized, that the playback needle of my invention may be caused to follow precisely the path of the stylus which cut the record in question, further accuracy of reproduction is provided in that the angular relationship of the needle and support members to the sound track does not change from the beginning of the playback to the end thereof. This also, of course, is a duplication of conditions during the cutting of the disc.

It may be noted that the apparatus of my invention is peculiarly effective in the playback of records which have been damaged by warping, reproduction in such cases being altogether free from noticeable "wowing." The explanation of this phenomenon has not been definitely established, but it is believed due to the fact that the needle and mounting are almost without inertia and respond instantly to variations in a disc surface.

The foregoing is in specific terms, and many obvious modifications will suggest themselves so that for the true scope of the invention reference should be had to the appended claims.

I claim:

1. The combination with rails normally radial to a phonograph record of a carriage for a pick-up needle including a body member, wheels for said member guided and supported by said rails, a support for a needle cartridge pivoted in the lower portion of said body member and having a slot in the upper portion thereof, and a cam member having an upper and a lower surface pivoted in the upper portion of said body member and slidable through said slot said upper surface of said camming member supporting the upper extremity of said slot and thereby lifting said body member when said camming member is raised on its pivot and having a notch in the lower surface thereof for engagement with said slot in said support to hold the carriage in raised position.

2. The combination with rails normally radial to a phonograph record of a carriage for a pick-up needle including a body member, wheels for said member guided and supported by said rails, a support for a needle cartridge pivoted in the lower portion of said body member and having a slot in the upper portion thereof, and a cam member having an upper and a lower surface pivoted in the upper portion of said body member and slidable through said slot said upper surface of said camming member supporting the upper extremity of said slot and thereby lifting said body member when said camming member is raised on its pivot and having a notch in the lower surface thereof adjacent the pivot for engagement with said slot in said support to hold the carriage in raised position.

3. A carriage for a tone arm of the nature described comprising two vertically spaced substantially parallel bars, a frame, a plurality of wheels for supporting said frame on the lower of said bars, another bar pivotally mounted adjacent one of its ends in said frame for movement toward and away from said upper bar in a plane substantially parallel to the plane of said bars, another wheel mounted in said last-mentioned bar spaced from said pivot and in the plane of the first-mentioned bars and thereby adapted normally to run along the lower surface of the upper of said two first-mentioned bars, means secured to the second end of said last-mentioned bar including a spring, a support for said spring said support being eccentrically mounted in said frame for variably urging said last mentioned wheel toward said upper bar, and means including an eccentrically-mounted stop in said frame beneath said last-mentioned bar for variably limiting its movement away from said upper bar.

4. A carriage for a tone arm of the nature described comprising two vertically spaced substantially parallel bars, a frame, a plurality of wheels for supporting said frame on the lower of said bars, another bar pivotally mounted adjacent one of its ends in said frame for movement toward and away from said upper bar in a plane substantially parallel to the plane of said bars, another wheel mounted in said last-mentioned bar spaced from said pivot and in the plane of the first-mentioned bars and thereby adapted normally to run along the lower surface of the upper of said two first-mentioned bars, means secured to the second end of said last-mentioned bar including a spring, a support for said spring said support being mounted in said frame for variably urging said last-mentioned wheel toward said upper bar, and means including a stop in said frame beneath said last-mentioned bar for variably limiting its movement away from said upper bar.

EUGENE R. DE WEESE.

REFERENCES CITED

The following references are of record in the file of this patent:

UNITED STATES PATENTS

| Number | Name | Date |
|---|---|---|
| 531,690 | McKelvey | Jan. 1, 1895 |
| 637,197 | Berliner | Nov. 14, 1899 |
| 1,027,350 | Mikorey | May 21, 1912 |
| 1,868,304 | Cargill | July 19, 1932 |
| 2,006,605 | Putnoky | July 2, 1935 |
| 2,016,505 | Lucarelle | Oct. 8, 1935 |
| 2,082,353 | Proctor | June 1, 1937 |
| 2,219,230 | Krause | Oct. 22, 1940 |
| 2,255,218 | Hoehn | Sept. 9, 1941 |
| 2,287,809 | Leonard | June 30, 1942 |
| 2,413,206 | Worsham | Dec. 24, 1946 |

FOREIGN PATENTS

| Number | Country | Date |
|---|---|---|
| 846,487 | France | Sept. 18, 1939 |